United States Patent
Klimasauskas et al.

[19]

[11] Patent Number: 5,877,954
[45] Date of Patent: Mar. 2, 1999

[54] HYBRID LINEAR-NEURAL NETWORK PROCESS CONTROL

[75] Inventors: Casimir C. Klimasauskas, Sewickley; John P. Guiver, Pittsburgh, both of Pa.

[73] Assignee: Aspen Technology, Inc., Cambridge, Mass.

[21] Appl. No.: 642,775

[22] Filed: May 3, 1996

[51] Int. Cl.[6] .................................................. G05B 13/04
[52] U.S. Cl. ............... 364/149; 364/148.01; 364/148.03; 364/150; 364/151; 706/16; 706/23
[58] Field of Search .................................. 395/23, 22, 21; 364/148, 149, 148.01, 148.02, 148.03, 150, 151; 706/15, 16, 23, 25, 26, 17

[56] References Cited

U.S. PATENT DOCUMENTS

| | | | |
|---|---|---|---|
| 5,111,531 | 5/1992 | Grayson et al. | 706/23 |
| 5,142,612 | 8/1992 | Skeirik | 706/23 |
| 5,159,660 | 10/1992 | Lu et al. | 706/23 |
| 5,386,373 | 1/1995 | Keeler et al. | 364/528.01 |
| 5,396,415 | 3/1995 | Konar et al. | 364/162 |
| 5,471,381 | 11/1995 | Khan | 364/148.03 |
| 5,477,444 | 12/1995 | Bhat et al. | 364/148.03 |

OTHER PUBLICATIONS

Gelardi, Paul, et al., "Partial Least–Squares Regression: A Tutorial", Analytica Chimica Acta, 185 (1986) pp. 1–17.
Serth, R.W., et al., "Gross Error Detection and Data Reconciliation in Steam–Metering Systems", A.I.Ch.E Journal, May 1986, vol. 32, No. 5, pp. 733–742.
Serth, R.W., et al., "Detection of Gross Errors in Nonlinearly Constrained Data: A Case Study", Chem. Eng. Comm. 1987, vol. 51, pp. 89–104.
Wold, Svante, et al., "Nonlinear PLS Modeling", Chemometrics and Intelligent Laboratory Systems, 7 (1989), pp. 53–65.
Kramer, et al., "Diagnosis Using Backpropagation Neural Networks—Analysis and Criticism", Computers Chem. Engng., vol. 14, No. 2, 1990, pp. 1323–1338.
Helland, Kristian, et al., "Recursive algorithm for partial least squares regression", Chemometrics and Intelligent Laboratory Systems, 14 (1991), pp. 129–137.
Puskorius, G.V., et al., "Decoupled Extended Kalman Filter Training of Feedforward Layered Networks", IEEE, 1991, pp. I–771–I–777.
Qin, S.J., et al., "Nonlinear PLS Modeling Using Neural Networks", Computers Chem. Engng., vol. 16, No. 4, 1992, pp. 379–391.

(List continued on next page.)

Primary Examiner—Tariq R. Hafiz
Assistant Examiner—Jason W. Rhodes
Attorney, Agent, or Firm—Pravel, Hewitt & Kimball

[57] ABSTRACT

A hybrid analyzer having a data derived primary analyzer and an error correction analyzer connected in parallel is disclosed. The primary analyzer, preferably a data derived linear model such as a partial least squares model, is trained using training data to generate major predictions of defined output variables. The error correction analyzer, preferably a neural network model is trained to capture the residuals between the primary analyzer outputs and the target process variables. The residuals generated by the error correction analyzer is summed with the output of the primary analyzer to compensate for the error residuals of the primary analyzer to arrive at a more accurate overall model of the target process. Additionally, an adaptive filter can be applied to the output of the primary analyzer to further capture the process dynamics. The data derived hybrid analyzer provides a readily adaptable framework to build the process model without requiring up-front knowledge. Additionally, the primary analyzer, which incorporates the PLS model, is well accepted by process control engineers. Further, the hybrid analyzer also addresses the reliability of the process model output over the operating range since the primary analyzer can extrapolate data in a predictable way beyond the data used to train the model. Together, the primary and the error correction analyzers provide a more accurate hybrid process analyzer which mitigates the disadvantages, and enhances the advantages, of each modeling methodology when used alone.

20 Claims, 8 Drawing Sheets

OTHER PUBLICATIONS

Su, Hong–Te, et al., "Integrating Neural Networks with First Principles Models of Dynamic Modeling", IFAC Symp. on DYCOR+, 1992, pp. 77–82.

Kramer, Mark A., et al., "Embedding Theoretical Models in Neural Networks", 1992 ACC/WA14, pp. 475–479.

Kramer, M.A., "Autoassociative Neural Networks", Computers Chem. Engng., vol. 16, No. 4, 1992, pp. 313–328.

deJong, Sijmen, "SIMPLS: an alternative approach to partial least squares regression", Chemometrics and Intelligent Laboratory Systems, 18 (1993), pp. 251–263.

Klimasauskas, C., "Developing a Multiple MACD Market Timing System," Advanced Technology for Developers, vol. 2, Special Issue, 4 Qtr. 1993, pp. 1–47.

Thompson, Michael L., et al., "Modeling Chemical Processes Using Prior Knowledge and Neural Networks", A.I.Ch.E. Journal, Aug. 1994, vol. 40, No. 8, pp. 1328–1340.

Haykin, Simon, "Neural Networks Expand SP's Horizons", IEEE Signal Processing Magazine, Mar. 1996, pp. 24–49.

Mulgrew, Bernard, "Applying Radial Basis Functions", IEEE Signal Processing Magazine, Mar. 1996, pp. 50–65.

Jain, Anik K., et al., Artificial Neural Networks: A Tutorial, Computer, Mar. 1996, vol. 29, No. 3, pp. 31–44.

Shang, Yi and Wah, Benjamin, "Global Optimization for Neural Network Training", Computer, Mar. 1996, vol. 29, No. 3, pp. 45–54.

Serbedzija, Nikola B., "Simulating Artificial Neural Networks on Parallel Architecture", Computer, Mar. 1996, vol. 29, No. 3, pp. 57–63.

Tan, Chew Lim, et al., "An Artificial Neural Network that Models Human Decision Making", Computer, Mar. 1996, vol. 29, No. 3, pp. 64–70.

Setiono, Rudy, et al., "Symbolic Representation of Neural Networks", Computer, Mar., 1996, vol. 29, No. 3, pp. 71–77.

Zhao, Hong, et al., "Modeling of Activated Sewage Wastewater Treatment Processes Using Integrated Neural Networks and a First Principle Model", IFAC, 13th World Congress, 1996, pp. 1–5.

Westinghouse Electric Corporation, Descriptive Bulletin 21–161, WDPFII System Overview, pp. 1–5.

Westinghouse Electric Corporation, Descriptive Bulletin 21–196, WDPFII WEStation Historian, pp. 1–4.

Westinghouse Electric Corporation, Descriptive Bulletin 21–188, WDPFII Distributed Processing Unit—Series 32, pp. 1–4.

Westinghouse Electric Corporation, Descriptive Bulletin 21–195, WEStation OpCon, pp. 1–4.

Westinghouse Electric Corporation, Descriptive Bulletin DB21–206, Standard Algorithms, pp. 1–8.

Westinghouse Electric Corporation, Descriptive Bulletin 21–189, WDPFII Westnet II Plus Data Highway, pp. 1–2.

Westinghouse Electric Corporation, Descriptive Bulletin 21–177, WDPFII Q–Line Process I/O, pp. 1–2.

White, David A., and Sofge, Donald A. (Ed.), Handbook of Intelligent Control, (pp. 283–356).

Su, Hong–Te, et al., "Integrating Neural Networks with First Principles Models for Dynamic Modeling," IFAC Symposium on DYCOR+, 1992, pp. 379–391.

Zhao, Hong, et al., "Modeling of Activated Sludge Wastewater Treatment Processes Using Integrated Neural Networks and A First Principle Model," IFAC, 13th World Congress, 1996, pp. 1–5.

Qin, S. Joe, "Partial Least Squares Regression for Recursive System Identification," Proceedings of the 32nd Conference on Decision and Control, San Antonio Texas, Dec. 1993, pp. 2617–2622.

Geladi, Paul, et al., "Partial Least–Squares Regression: A Tutorial," Analytica Chimica Acta, 185 (1986), pp. 1–17.

McLain, Richard B., et al., "An Adaptive Nonlinear Control Strategy Derived from a Biological Control System," 1996 Southeastern Symposium on System Theory, pp. 66–70, 1996.

HYBRID LINEAR-NEURAL NETWORK PROCESS CONTROL

SPECIFICATION

BACKGROUND OF THE INVENTION

1. Field of the Invention

This invention relates to an apparatus and a method for modeling and controlling an industrial process, and more particularly, to an apparatus and a method for adaptively modeling and controlling an industrial process. P 2. Description of the Related Art In industrial environments such as those in oil refineries, chemical plants and power plants, numerous processes need to be tightly controlled to meet the required specifications for the resulting products. The control of processes in the plant is provided by a process control apparatus which typically senses a number of input/output variables such as material compositions, feed rates, feedstock temperatures, and product formation rate. The process control apparatus then compares these variables against desired predetermined values. If unexpected differences exist, changes are made to the input variables to return the output variables to a predetermined desired range.

Traditionally, the control of a process is provided by a proportional-integral-derivative (PID) controller. PID controllers provide satisfactory control behavior for many single input/single output (SISO) systems whose dynamics change within a relatively small range. However, as each PID controller has only one input variable and one output variable, the PID controller lacks the ability to control a system with multivariable input and outputs. Although a number of PID controllers can be cascaded together in series or in parallel, the complexity of such an arrangement often limits the confidence of the user in the reliability and accuracy of the control system. Thus the adequacy of the process control may be adversely affected. Hence, PID controllers have difficulties controlling complex, non-linear systems such as chemical reactors, blast furnaces, distillation columns, and rolling mills.

Additionally, plant processes may be optimized to improve the plant throughput or the product quality, or both. The optimization of the manufacturing process typically is achieved by controlling variables that are not directly or instantaneously controllable. Historically, a human process expert can empirically derive an algorithm to optimize the indirectly controlled variable. However, as the number of process variables that influence indirectly controlled variables increases, the complexity of the optimization process rises exponentially. Since this condition quickly becomes unmanageable, process variables with minor influence in the final solution are ignored. Although each of these process variables exhibits a low influence when considered alone, the cumulative effect of the omissions can greatly reduce the process control model's accuracy and usability. Alternatively, the indirectly-controlled variables may be solved using numerical methods. However, as the numerical solution is computationally intensive, it may not be possible to perform the process control in real-time.

The increasing complexity of industrial processes, coupled with the need for real-time process control, is driving process control systems toward making experience-based judgments akin to human thinking in order to cope with unknown or unanticipated events affecting the optimization of the process. One control method based on expert system technology, called expert control or intelligent control, represents a step in the adaptive control of these complex industrial systems. Based on the knowledge base of the expert system, the expert system software can adjust the process control strategy after receiving inputs on changes in the system environment and control tasks. However, as the expert system depends heavily on a complete transfer of the human expert's knowledge and experience into an electronic database, it is difficult to produce an expert system capable of handling the dynamics of a complex system.

Recently, neural network based systems have been developed which provide powerful self-learning and adaptation capabilities to cope with uncertainties and changes in the system environment. Modelled after biological neural networks, engineered neural networks process training data and formulate a matrix of coefficients representative of the firing thresholds of biological neural networks. The matrix of coefficients are derived by repetitively circulating data through the neural network in training sessions and adjusting the weights in the coefficient matrix until the outputs of the neural networks are within predetermined ranges of the expected outputs of the training data. Thus, after training, a generic neural network conforms to the particular task assigned to the neural network. This property is common to a large class of flexible functional form models known as non-parametric models, which includes neural networks, Fourier series, smoothing splines, and kernel estimators.

The neural network model is suitable for modeling complex chemical processes such as non-linear industrial processes due to its ability to approximate arbitrarily complex functions. Further, the data derived neural network model can be developed without a detailed knowledge of the underlying processes. Although the neural network has powerful self-learning and adaptation capabilities to cope with uncertainties and changes in its environment, the lack of a process-based internal structure can be a liability for the neural network. For instance, when training data is limited and noisy, the network outputs may not conform to known process constraints. For example, certain process variables are known to increase monotonically as they approach their respective asymptotic limits. Both the monotonicity and the asymptotic limits are factors that should be enforced on a neural network when modeling these variables. However, the lack of training data may prevent a neural network from capturing either. Thus, neural network models have been criticized on the basis that 1) they are empirical; 2) they possess no physical basis; and 3) they produce results that are possibly inconsistent with prior experience.

Insufficient data may thus hamper the accuracy of a neural network due to the network's pure reliance on training data when inducing process behavior. Qualitative knowledge of a function to be modeled, however, may be used to overcome the sparsity of training data. A number of approaches have been utilized to exploit prior known information and to reduce the dependence on the training data alone. One approach deploys a semi-parametric design which applies a parametric model in tandem with the neural network. As described by S. J. Qin and T. J. McAvoy in "Nonlinear PLS Modeling Using Neural Networks", *Computers Chem. Engng.*, Vol. 16, No. 4, pp. 379–391 (1992), a parametric model has a fixed structure derived from a first principle which can be existing empirical correlations or known mathematical transformations. The neural network may be used in a series approach to estimate intermediate variables to be used in the parametric model.

Alternatively, a parallel semi-parametric approach can be deployed where the outputs of the neural network and the parametric model are combined to determine the total model output. The model serves as an idealized estimator of the process or a best guess at the process model. The neural network is trained on the residual between the data and the parametric model to compensate for uncertainties that arise from the inherent process complexity.

Although the semi-parametric model provides a more accurate model than either the parametric model or the neural network model alone, it requires prior knowledge, as embodied in the first principle in the form of a set of equations based on known physics or correlations of input data to outputs. The parametric model is not practical in a number of instances where the knowledge embodied in the first principle is not known or not available. In these instances, a readily adaptable framework is required to assist process engineers in creating a process model without advance knowledge such as the first principle.

SUMMARY OF THE INVENTION

The present invention provides a hybrid analyzer having a data derived primary analyzer and an error correction analyzer connected in parallel. The primary analyzer, preferably a data derived linear model such as a partial least squares (PLS) model, is trained using training data to generate major predictions of defined output variables. The training data as well as the data for the actual processing are generated by various components of a manufacturing plant and are sampled using a plurality of sensors strategically placed in the plant.

The error correction analyzer, preferably a non-linear model such as a neural network model, is trained to capture the residuals between the primary analyzer outputs and the target process variables. The residuals generated by the error correction analyzer are then summed with the output of the primary analyzer. This compensates for the error residuals of the primary analyzer and develops a more accurate overall model of the target process.

The data derived hybrid analyzer provides a readily adaptable framework to build the process model without requiring advanced information. Additionally, the primary analyzer embodies a data-derived linear model which process control engineers can examine and test. Thus, the engineers can readily relate events in the plant to the output of the analyzer. Further, the primary analyzer and its linear model allow the engineer to extrapolate the model to handle new conditions not faced during the training process. The hybrid analyzer also addresses the reliability of the process model output over the operating range since the primary analyzer can extrapolate data in a predictable way beyond the data used to train the model. Together, the primary and the error correction analyzers mitigate the disadvantages, and enhance the advantages of each modeling methodology when used alone.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
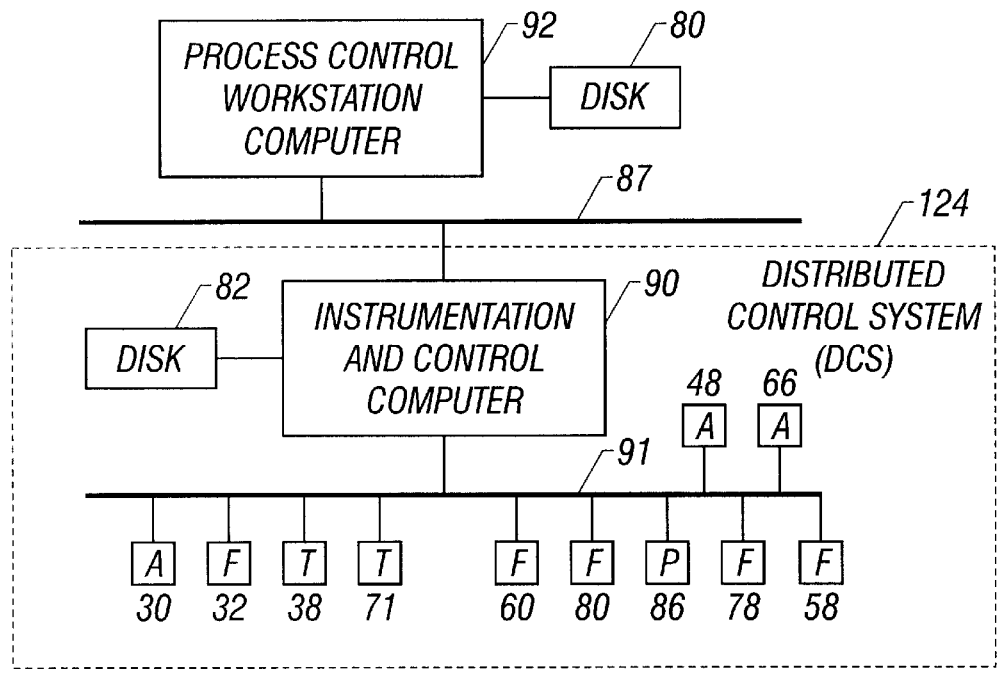
FIG. 1 is a block diagram of a computer system functioning as the hybrid analyzer according to the present invention.

FIG. 1 illustrates the architecture of the computer system for providing an apparatus for modeling and controlling a process. The hybrid analyzer of FIG. 1 preferably operates on a general purpose computer system such as an Alpha workstation, available from Digital Equipment Corporation. The Alpha workstation is in turn connected to appropriate sensors and output drivers. These sensors and output drivers are strategically positioned in an operating plant to collect data as well as to control the plant. The collected data is archived in a data file 110 (FIG. 2) for training purposes. The data collected varies according to the type of product being produced. For illustrative purposes, FIG. 1 shows the architecture of the computer supporting the process control apparatus of the present invention and its relationship to various sensors and output drivers in a representative plant. In the embodiment disclosed here, the representative plant is a refinery or a chemical processing plant having a number of process variables such as temperature and flow rate variables. These variables are sensed by various instruments. It should be understood that the present invention may be used in a wide variety of other types of technological processes or equipment in the useful arts.

In FIG. 1, the collected data include various disturbance variables such as a feed stream flow rate as measured by a flow meter 32, a feed stream temperature as measured by a temperature sensor 38, component feed concentrations as determined by an analyzer 30, and a reflux stream temperature in a pipe as measured by a temperature sensor 71. The collected data also include controlled process variables such as the concentration of produced materials, as measured by analyzers 48 and 66. The collected data further include manipulated variables such as the reflux flow rate as set by a valve 80 and determined by a flow meter 78, a reboil steam flow rate as set by a valve 60 and measured by a flow meter 58 and the pressure in a tank as controlled by a valve 86.

These sampled data reflect the condition in various locations of the representative plant during a particular sampling period. However, as finite delays are encountered during the manufacturing process, the sampled data reflects a continuum of the changes in the process control. For instance, in the event that a valve is opened upstream, a predetermined time is required for the effect of the valve opening to be reflected in the collected variables further downstream of the valve. To properly associate the measurements with particular process control steps, the collected data may need to be delayed, or time-shifted, to account for timings of the manufacturing process. According to the present invention, this is done in a manner set forth below.

The measured data collected from analyzers 30, 48, 58, 66, and 78 and sensors 32, 38 and 71 are communicated over a communications network 91 to an instrumentation and control computer 90. The measured data can further be transferred from the instrumentation computer 90 to another process control workstation computer 92 via a second communication network 87. The instrumentation computer 90 is connected to a large disk 82 or other suitable high capacity data storage devices for storing the historical data file 110 (FIG. 2), as collected using the previously described sensors and output drivers. Further, the process control workstation computer 92 is connected to a large storage disk 80 to store data. In addition to storing data, the disks 80 and 82 also store executable files which, upon execution, provide the process control capability.

The computers 90 and 92 are preferably high performance workstations such as the Digital Equipment Alpha workstations or SPARC workstations, available from Sun Microsystems, or high performance personal computers such as Pentium-Pro based IBM compatible personal computers. Further, the computer 90 may be a single-board computer with a basic operating system such as the board in the WDPF II DPU Series 32, available from Westinghouse Corporation. Additionally, each one of the computers 90 and 92 may operate the hybrid analyzer of the present invention alone, or both computers 90 and 92 may operated as distributed processors to contribute to the real-time operation of the hybrid analyzer of the present invention.

Figure 2:
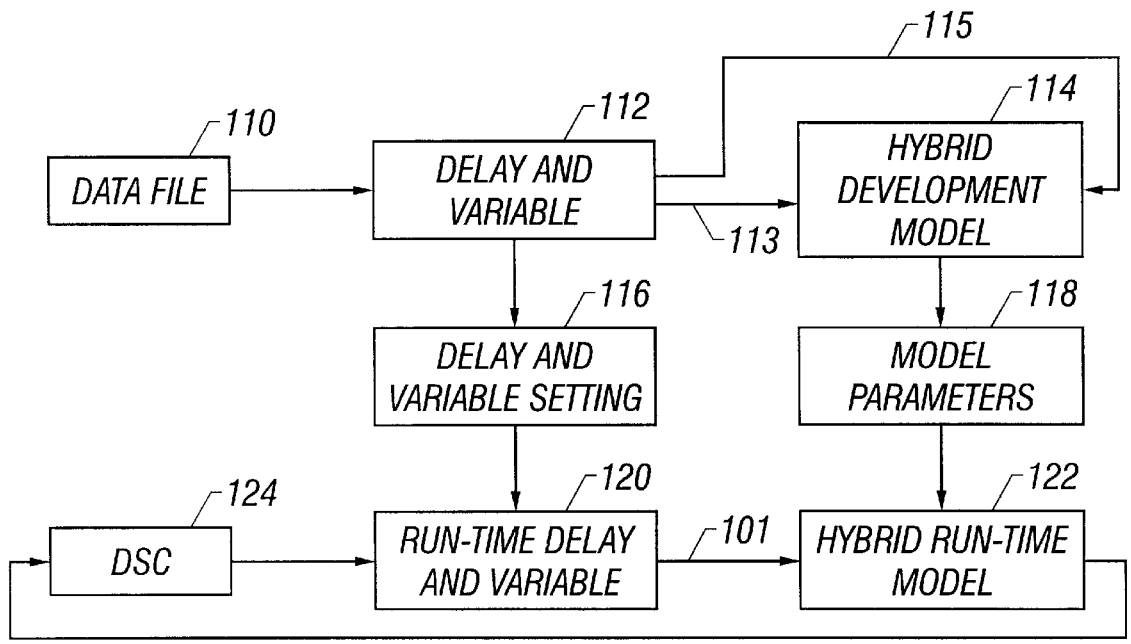
FIG. 2 is a block diagram illustrating the development and deployment of the hybrid analyzer of FIG. 1.

In FIG. 1, the workstation computer 92 can be configured to store the historical data acquired by the instrumentation computer 90 into a data file 110 (FIG. 2) on the disk 80 and further executes a hybrid run-time model 122 of FIG. 2 for process control purposes. The output values generated by the hybrid run-time analyzer 122 on the process control workstation computer 92 are provided to the instrumentation computer 90 over the network 87. The instrumentation computer 90 then sends the necessary control commands over the communications network 91 to one or more valve controllers 32, 60 and 80 to turn on and off the valves appropriately to cause various process changes. Alternatively, the instrumentation computer 90 can store the historical data file 110 on its disk drive 82 and further execute the hybrid run-time analyzer 122 in a stand-alone mode. Collectively, the computer 90, the disk 82, and various sensors and output drivers form a distributed control system (DCS) 124, as shown in FIG. 2.

Turning now to FIG. 2, a diagram showing the development and deployment of the hybrid analyzers or models 114 and 122 is shown. It is to be noted that the hybrid analyzers, or hybrid models 114 and 122, are preferably implemented as software which is executed on the computer 90 individually, the computer 92 individually, or a combination of computers 90 and 92. Further, although the disclosed embodiments are implemented as software routines, the present invention contemplates that the analyzers can also be implemented in hardware using discrete components, application specific integrated circuits, or field programmable gate array devices.

In the analyzer of FIG. 2, historical data from sensors and output drivers 30, 32, 38, 48, 58, 60, 66, 71, 78, 80 and 86 are stored in the data file 110 on the disk 82. The data file 110 preferably contains three types of variables: manipulated variables (MVs), disturbance variables (DVs), and controlled variables (CVs). Manipulated variables are variables which a plant operator can manipulate to control and affect changes in the process. Disturbance variables are variables such as those from unexpected changes which are beyond the operator's control at which may be outputs of prior processes, and controlled variables are the variables that the process control is trying to control such as a certain product consistency, feed temperature, or feed level, among others. The historical data stored in the data file 110 is preferably collected from various sampling points in an operational plant, with the MVs, DVs and CVs as the basic data elements for training the hybrid analyzer or model 100 for process control purposes. The data file 110 is preferably archived in a large capacity data storage device such as the disk 80 in the process control workstation computer 92 and/or the disk 82 of the instrumentation computer 90.

In FIG. 2, the MVs and DVs are provided to a delay and variable selection module 112. The module 112 delays, or offsets, certain input variables in time to emphasize that the sampling of certain variable measurements can occur at different points in the process to be controlled. The delays asserted in the module 112 compensate for the differentials caused by having a measurement upstream of another measurement, as previously discussed. The output of the delay and variable selection module 112 is provided to a hybrid development analyzer or model 114.

The hybrid development analyzer or model 114 receives input variables 113 as well as target output variables 115, including the CVs. The data variables 113 and 115 may further be suitably screened by a data selection apparatus such as that discussed in a co-pending patent application having application Ser. No. 08/642,779 entitled "APPARATUS AND METHOD FOR SELECTING A WORKING DATA SET FOR MODEL DEVELOPMENT" and commonly assigned to the assignee of the present invention, hereby incorporated by reference. The hybrid development analyzer or model 114 in FIG. 2 has two analyzers or models operating in parallel, a primary analyzer or model 132 (FIG. 4) and an error correction analyzer or model 136 (FIG. 4), both receiving the same set of data variables. The hybrid development analyzer or model 122 is trained using the procedures discussed below. The output of the hybrid development analyzer or model 114 is provided to a model parameter module 118 for embodying the parameters derived during the training process to be used by a hybrid run-time analyzer or model 122. Also, the output from the delay and variable selection module 112 is also provided to a second delay and variable settings module 116 which embodies the delays and variable adjustments made during training. Thus, the modules 116 and 118 embody the knowledge gained from the training process in setting the run-time model variables.

From the delay and variable settings module 116, data is provided to a run-time delay and variable selection module 120. Further, from the model parameter module 118, the data is provided to the hybrid run time analyzer or model 122. The output of the hybrid run time analyzer or model 122 is provided to a distributed control system (DCS) 124. The DCS system 124 supervises the control and data acquisition process in the plant. Typically, the DCS system 124 provides distributed processing units, control units, a console for interacting with the DCS components, and a data historian, or data repository, which provides for data collection and archival storage of plant historical data. Typical data archived by the data repository include various process variable status, alarm messages, operator event messages, sequence of events data, laboratory data, file data, and pre- and post-event data. The collected data are stored typically in a temporary file before they are transferred to a permanent storage device such as an optical disk, a removable magnetic disk, or magnetic tapes. Data is thus collected and archived by the distributed control system 124 and forwarded to the run-time delay and variable selection module 120 which delays, or shifts, certain data before it is presented to the run time analyzer or model 122. The output of the run-time analyzer 122 may be all or a portion of final or intermediate process variables which are selected or defined by the user.

In FIG. 2, the analyzer training or development is performed by the delay and variable selection module 112 and the hybrid development analyzer or model 114. The selection module 112 performs the variable selection process where some or all of the variables are picked. Further, the picked variables may be time-shifted to account for the delays encountered during the manufacturing process, as discussed earlier. Additionally, the selection module 112 can sample the data variables on a continuous basis, or it can sample the data variables after each pre-determined delay time periods. The sampling delay period can either be user selectable, or it can be automatically determined. In one embodiment, the delay period is determined using a genetic algorithm of the type known to those skilled in the art. A suitable genetic algorithm, for example, is generally discussed in an article by applicant Casimir C. Klimasauskas in "Developing a Multiple MACD Market Timing System", *Advanced Technology for Developers*, Vol. 2, pp 3–10 (1993).

After processing training data stored in the data file 110, the delay and variable selection module 112 stores delay and variable settings in the module 116. Similarly, the model parameter module 118 stores configuration data of the hybrid analyzer based on the training of the hybrid development analyzer 114.

During the operation of the process control system, the data stored in the delay and variable settings module 116 are loaded into the delay and variable selection module 120. Similarly, the data from the model parameter module 118 are loaded into the hybrid run-time analyzer or model 122. Once the configuration data and parameters have been loaded into modules 120 and 122, the process control is ready to accept data from the DCS 124.

Figure 3:
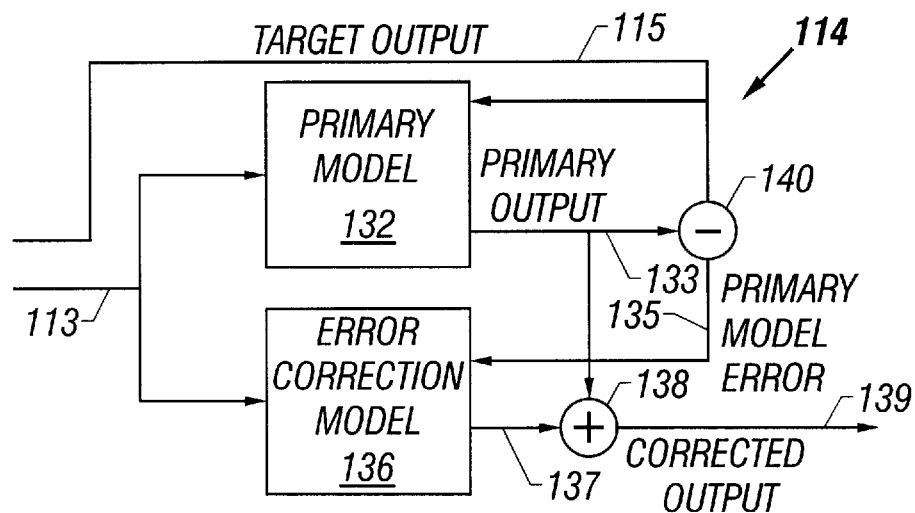
FIG. 3 is a block diagram illustrating the hybrid development analyzer of FIG. 2.

Turning now to FIG. 3, the hybrid development analyzer or model 114 includes a primary analyzer or model 132 and an error correction analyzer or model 136. In FIG. 3, some or all input variables 113 and target output variables 115, from the data file 110 are selected and provided to the primary analyzer 132 and the error correction analyzer or model 136. An output 133 of the primary analyzer or model 132 and the target output variable 115 are provided to a subtractor 140 to compute the residual, or difference, between the output of the primary analyzer 132 and the target output variable 115.

The output of the subtractor 140 is provided as the target output of the error correction analyzer or model 136. An output 137 of the error correction analyzer or model 136 is provided to one input of an adder 138. The other input of the adder 138 is connected to the output 133 of the primary analyzer or model 132. The adder 138 generates a corrected output 139 by summing the primary output 133 with the error correction model output 137. The parameters estimated in the models 132 and 136 are provided to the model parameter module 118 of FIG. 2. The data stored in the model parameter module 118 is subsequently provided as the parameters of the hybrid run-time analyzer or model 122 to provide process control during the run-time mode of the system.

Figure 4:
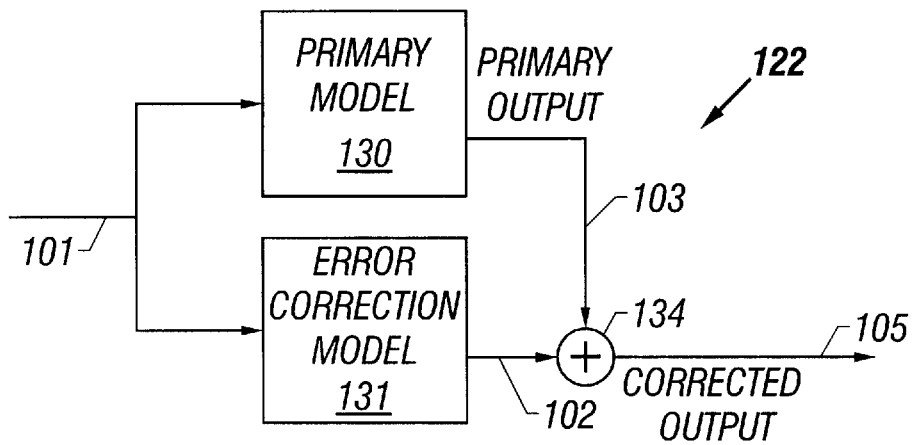
FIG. 4 is a block diagram illustrating the run-time hybrid analyzer of FIG. 2.

Turning now to FIG. 4, the details of the hybrid run-time analyzer or model 122 are disclosed. Similar to the hybrid development analyzer or model 114, the hybrid run-time analyzer or model includes a primary analyzer or model 130 and an error correction analyzer or model 131. The internal configuration and parameter settings of the primary analyzer or model 130 and the error correction analyzer or model 131 are provided by the model parameter module 118. The output of the run-time primary analyzer 130 and the output of the run-time error correction analyzer 131 is provided to an adder 134. The adder 134 generates a corrected output by summing the output of the primary run-time analyzer 130 with the output of the run-time error correction analyzer 131. The output of the adder 134 is provided as the input to the DCS 124 of FIG. 2.

Figure 4A:
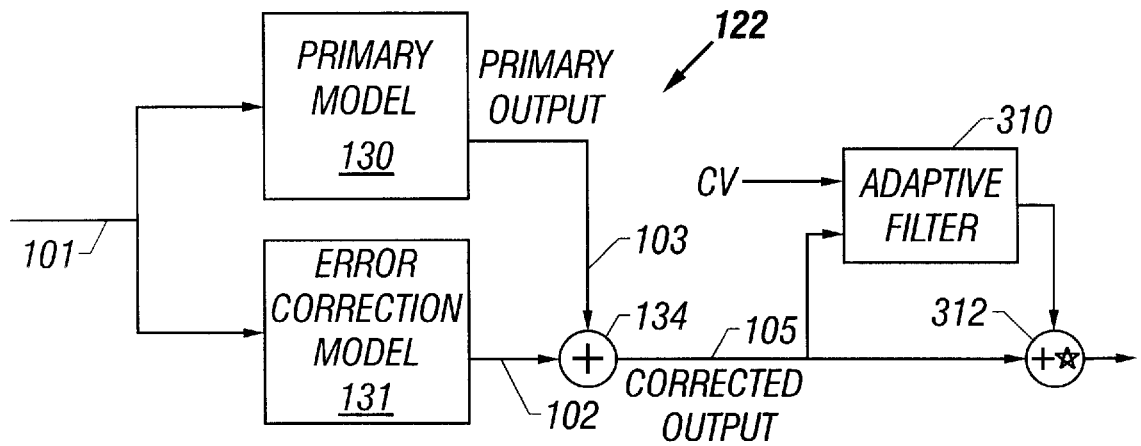
FIG. 4A is a block diagram illustrating another embodiment of the run-time hybrid analyzer of FIG. 2.

FIG. 4A shows an alternate embodiment of FIG. 4. In FIG. 4A, a number of elements are common to those of FIG. 4. Thus, identically numbered elements in FIGS. 4 and 4A bear the same description and need not be discussed. In FIG. 4A, the output 105 of the adder 134 is presented to an adaptive filter 310 to adjust the composite model output from the adder 134 to account for measurement offsets. A number of conventional adaptive filters may be used, including a Kalman filter as known to those skilled in the art and disclosed in G. V. Puskorius and L. A. Feldkamp, "Decoupled Extended Kalman Filter Training of Feedforward Layered Networks", *IEEE Journal*, (1991). The adaptive filter 310 also receives as input the controlled variables, among others. Additionally, the output 105 is further presented to a scaling and offset module 312. The module 312 performs a multiply and cumulate operation on the output of the adaptive filter 310 and the output 105 to generate a corrected, filtered output which more accurately reflects the process dynamics.

The details of the primary analyzer or model 132 will be discussed next. The primary analyzer 132 is preferably a data derived linear analyzer or model. The linear model is advantageous in that process engineers can quantify the relationship between the input variables and the output variables. Thus, process engineers can extrapolate the input data. Further, the primary analyzer or model 132 is data derived such that no prior knowledge of a first principle is necessary. Preferably, the primary analyzer or model 132 is a partial least squares model.

In chemometrics, partial least squares (PLS) regression has become an established tool for modeling linear relations between multi-variate measurements. As described in Paul Geladi and Bruce R. Kowalski, "Partial Least-Squares Regression: A Tutorial", *Analytica Chimica Acta*, Vol. 185, pp. 1–17 (1986), the PLS approach typically uses a linear regression model which relates the model inputs to the outputs through a set of latent variables. These latent variables are calculated iteratively and they are orthogonal to each other. As a result, compared to other linear regression models, the PLS model works well for the cases where input variables are correlated and the data are sparse.

In the PLS model, the regression method compresses the predicted data matrix that contains the value of the predictors for a particular number of samples into a set of latent variable or factor scores. By running a calibration on one set of data (the calibration set), a regression model is made that is later used for prediction on all subsequent data samples.

To perform the PLS regression, input and output data are formulated as data matrices X and Y respectively:

$$X = \begin{bmatrix} x_{11} & x_{12} & \ldots & x_{1m} \\ x_{21} & x_{22} & \ldots & x_{2m} \\ \cdot & \cdot & & \cdot \\ \cdot & \cdot & & \cdot \\ \cdot & \cdot & & \cdot \\ x_{N1} & x_{N2} & \ldots & x_{Nm} \end{bmatrix} ; Y = \begin{bmatrix} y_{11} & y_{12} & \ldots & y_{1p} \\ y_{21} & y_{22} & \ldots & y_{2p} \\ \cdot & \cdot & & \cdot \\ \cdot & \cdot & & \cdot \\ \cdot & \cdot & & \cdot \\ y_{N1} & y_{N2} & \ldots & y_{Np} \end{bmatrix}$$

where each row is composed of one set of observations and N is the number of sets of observations. The PLS model is built on a basis of data transformation and decomposition through latent variables. The input data block X is decomposed as a sum of bilinear products of two vectors, $t_h$ and $p'_h$, in addition to a residual matrix E:

$$X = \sum_{h=1}^{r} t_h p'_h + E = TP' + E$$

where P' is made up of the p' as rows and T of the t as columns. Similarly, the output data block Y is composed as $$Y = \sum_{h=1}^{r} u_h q'_h + F = UQ' + F$$

where Q' is made up of the q' as rows and U of the u as columns, in addition to a residual matrix F. Further, $t_h$ and $u_h$ are called score vectors of the h-th factor, $p_h$ and $q_h$ are called loading vectors corresponding to these factors. These vectors are computed such that the residual matrices E and F are minimized.

The PLS model builds a simplified regression model between the scores T and U via an inner relation:

$$u_h = b_h t_h + e$$

where $b_h$ is a coefficient which is determined by minimizing the residual e. Under that case, the regression model is $$Y = x'W (P'W)^{-1}BQ'$$

where W is a weighting matrix used to create orthogonal scores and B is a diagonal matrix containing the regression coefficients $b_h$.

Figure 5:
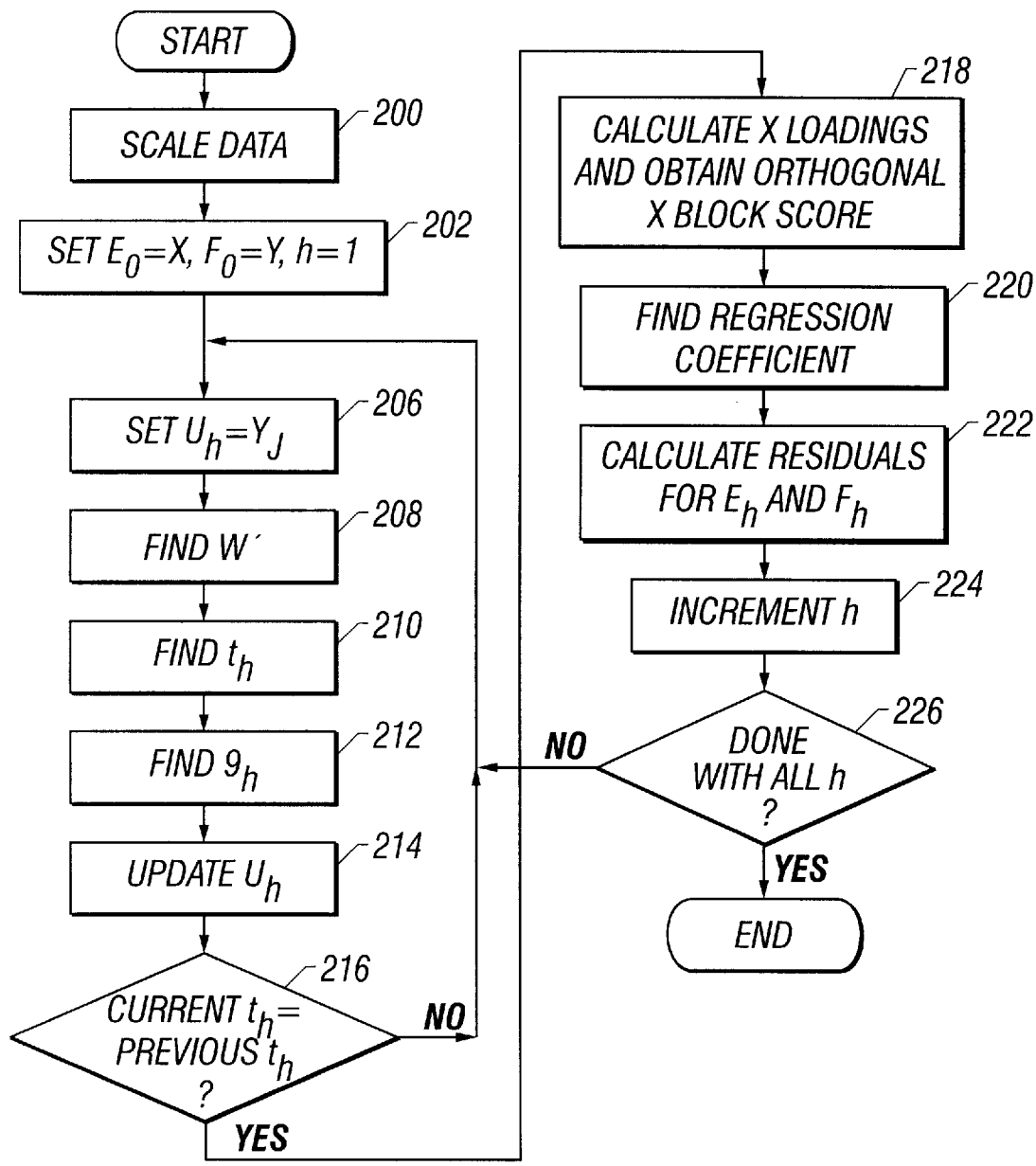
FIG. 5 is a flow chart illustrating the process of training the primary analyzer of FIG. 3.

Turning now to FIG. 5, the routine to train or develop the PLS primary analyzer or model 132 is disclosed. In step 200, the input variables are scaled such that the input data X and the output data Y are preferably mean-centered and fitted into a unit-variance as follows:

$$x_{ij} = (x_{ij} - \overline{x}_j)/S_j^x$$

where $$\overline{x} = [\overline{x}_1, \overline{x}_2, \ldots, \overline{x}_m]$$

$$\overline{x}_j = \frac{1}{N} \sum_{i=1}^{N} x_{ij}$$

$$S_j^x = \sqrt{\frac{1}{N-1} \cdot \sum_{i=1}^{N} (x_{ij} - \overline{x}_j)^2}$$

and $$y_{ij} = (y_{ij} - \overline{y}_j)/S_j^y$$

with $$\overline{y} = [\overline{y}_1, \overline{y}_2, \ldots, \overline{y}_p]$$

$$\overline{y}_j = \frac{1}{N} \sum_{i=1}^{N} y_{ij}$$

$$S_j^y = \sqrt{\frac{1}{N-1} \sum_{i=1}^{N} (y_{ij} - \overline{y}_j)^2}$$

Next, the variables E, F, and H are initialized in step 202 by setting $E_o=X$, $F_o=Y$, and $h=1$. Further, the processing of each latent component h is performed in steps 206–226.

In step 206, one column of Y is used as a starting vector for u such that $u_h=y_j$. Next, in the X block, the value of w' is calculated in step 208 as:

$$w'_h = u'_h E_{h-1}/\|u'_h E_{h-1}\|$$

In step 210, $t_h$ is calculated from $E_{h-1}$ and $w'_h$:

$$t'_h = E_{h-1} W_h$$

Next, in the Y block, $q_h$ is calculated from $F_{h-1}$ and $t_h$ in step 212 as follows:

$$q'_h = t'_h F_{h-1}/\|t'_h F_{h-1}\|$$

In step 214, $u_h$ is updated by the following equation:

$$u_h = F_{h-1} q_h$$

Next, in step 216, the routine checks for convergence by examining whether if the current $t_h$ is equal to the previous $t_h$, within a certain predetermined rounding error. If not, the routine loops back to step 206 to continue the calculations. Alternatively, from step 216, if the current $t_h$ is equal to the previous $t_h$, the routine calculates the X loadings and obtains the orthogonal X block scores in step 218. The score is computed as follows:

$$p'_h = t'_h E_{h-1}/t'_h t_h$$

$p_h$ is then normalized such that:

$$P'_{h\_new} = P_{h\_old}/\|P'_{h\_old}\|;$$

$$t_{h\_new} = t_{h\_old} \|P'_{h\_old}\|$$

$$W'_{h\_new} = W'_{h\_old} \|P'_{h\_old}\|$$

where $P'_h$, $q'_h$ and $w'_h$ are the PLS model parameters that are saved for prediction by the run-time model; $t_h$ and $u_h$ are scores that are saved for diagnostic and/or classification purposes.

Next, in step 220, the routine finds the regression coefficient b for the inner relation:

$$b_h = u'_h t_h / t'_h t_h$$

Further, the routine of FIG. 5 calculates the residuals in step 222. In step 222, for the h component of the X block, the outer relation is computed as:

$$E_h = E_{h-1} - t_h P_h; E_o = X$$

Further, in step 222, for the h component of the Y block, the mixed relation is subject to:

$$F_n = F_{h-1} - b_h t_h q'_h, F_o = Y$$

Next, the h component is incremented in step 224. In step 226, the routine checks to see if all h components, or latent variables, have been computed. If not, the routine loops back to step 206 to continue the computation. Alternatively, from step 226, if all h components have been computed, the routine exits. In this manner, regression is used to compress the predicted data matrix that contains the value of the predictors for a particular number of samples into a set of latent variable or factor scores. Further, by running a calibration on one set of data (the calibration set), a regression model is made that is later used for prediction on all subsequent sample.

The thus described process of FIG. 5 builds a PLS regression model between the scores t and u via an inner relation $$u_h = b_h t_h + e$$

where $b_h$ is a coefficient which is determined by minimizing the residual e. Under that case, the regression model is $$y' = x'W(P'W)^{-1}BQ'$$

Upon completion of the process shown in FIG. 5, the parameters are stored in the model parameter module 118 (FIG. 2) for subsequent utilization by the run-time primary analyzer or model 130 (FIG. 4).

In addition to the aforementioned, the present invention contemplates that the PLS analyzer further accepts filtered variables which better reflect the process dynamics. Additionally, the present invention also contemplates that the primary analyzer or model 132 can compute the derivative of the output 133 and then providing the derivative output to an integrator which outputs second predicted variables. Further, it is also contemplated that the primary analyzer or model 132 can apply splines to map the latent variables to the output variables. In certain applications, the primary analyzer may also accept prior values of the predicted values as inputs, or prior errors between the predicted target outputs as additional inputs.

Figure 6:
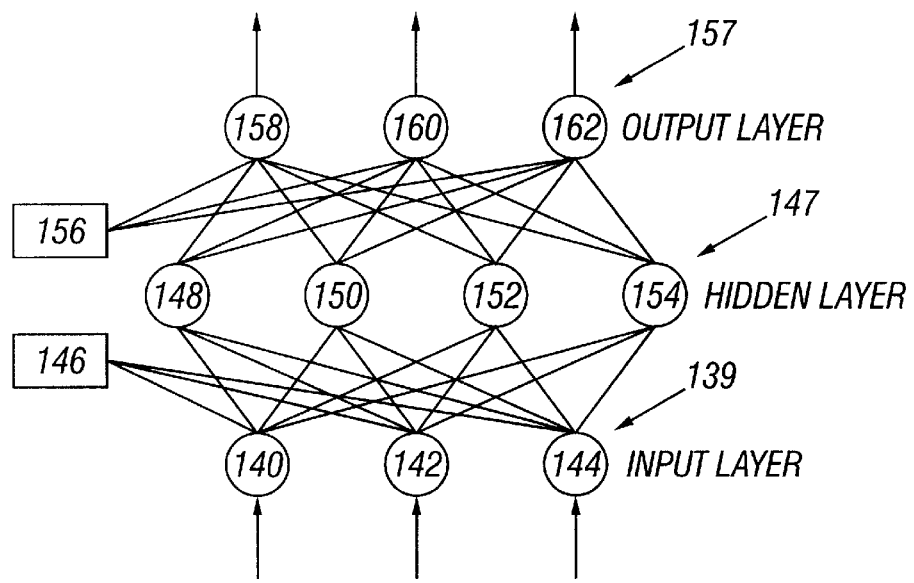
FIG. 6 is a diagram of a neural network of the error correction analyzer of FIGS. 3 and FIG. 4.

Attention is now directed to the error correction analyzer or model 136 which captures the residual between the primary analyzer or model 132 output and the target output. In the present invention, the neural network serves as a compensator rather than a whole process model for the prediction and other purposes. The same architecture is used for the error correction analyzers 131 and 136. Thus, the description of the neural network applies to both error correction analyzers 131 and 136. In the embodiment of FIG. 6, a back-propagation neural network is used as the error correction analyzer or model 131. In certain applications, the error correction analyzer may also accept prior values of the predicted values as inputs, or prior errors between the predicted target outputs as additional inputs.

Figure 7:
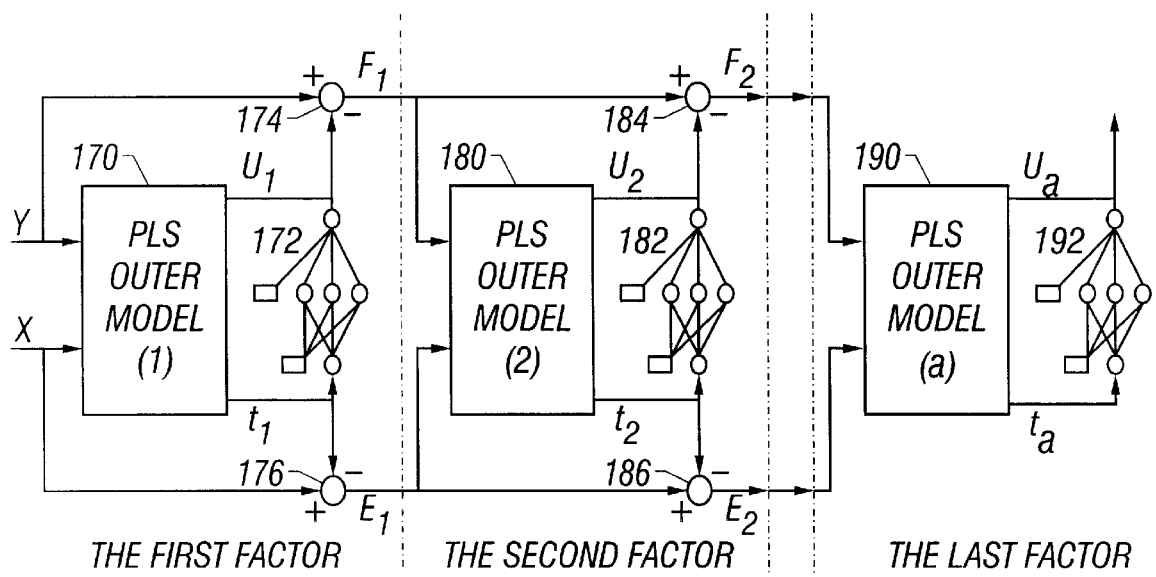
FIG. 7 is a diagram of a neural network PLS model of the error correction analyzer of FIGS. 3 and 4.
Figure 8:
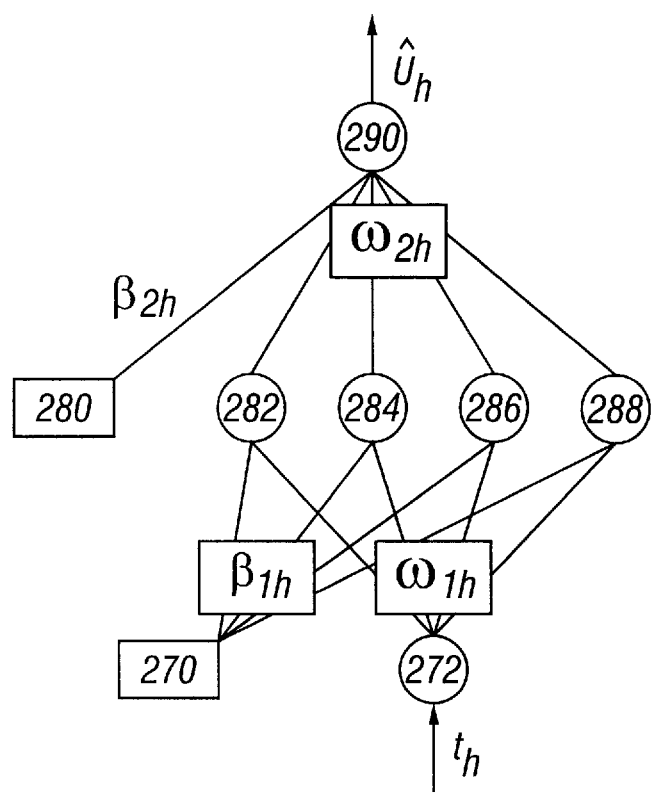
FIG. 8 is a block diagram for the inner neural network of FIG. 7.

In the embodiment of FIGS. 7–8, a neural network PLS model is used as the error correction analyzer or model 131. As the error correction analyzers or models 131 and 136 are structurally identical, the description of the neural network PLS error correction analyzer or model 131 applies equally to the description of the neural network PLS error correction analyzer or model 136.

FIG. 6 illustrates in more detail a conventional multi-layer, feedforward neural network which is used in one embodiment of the present invention as the error correction analyzer for capturing the residuals between the primary analyzer or model 132 output and the target output 115. The neural network of FIG. 6 has three layers: an input layer 139, a hidden layer 147 and an output layer 157. The input layer 139 has a plurality of input neurons 140, 142 and 144. The data provided to the input layer 139 of the neural network model are the same as that supplied to the primary analyzer or model 132, including the MVs and DVs.

Although the identical variables provided to the PLS analyzer of FIG. 3 can be used, the present invention contemplates that the input variables may be filtered to using techniques such as that disclosed in U.S. Pat. No. 5,477,444, entitled "CONTROL SYSTEM USING AN ADAPTIVE NEURAL NETWORK FOR TARGET AND PATH OPTIMIZATION FOR A MULTIVARIABLE, NONLINEAR PROCESS." Alternatively, a portion of the variables provided to the primary analyzer 132 is provided to the input layer 139. Additionally, certain latent variables generated by the primary analyzer 132 can be provided to the input layer 139. The latent variables can further be filtered, as previously discussed. The error correction analyzer may also use additional process variables which are available, but not used in the primary analyzer. These variables may be used directly or they may further be filtered to capture the process dynamics.

Correspondingly, the hidden layer 147 has a plurality of hidden neurons 148, 150, 152, and 154, while the output layer 157 has a plurality of output layer neurons 158, 160 and 162. The output of each input neuron 140, 142 or 144 is provided to the input of each of the hidden neurons 148, 150, 152, and 154. Further, an input layer bias neuron 146 is connected to each of the hidden layer neurons 148, 150, 152 and 154. Similarly, the output of each of the hidden layer neurons 148, 150, 152 and 154 is provided to the input of the each of the output layer neurons 158, 160 and 162. Further, a hidden layer bias neuron 156 generates outputs which are individually provided to the input of each of the output layer neurons 158, 160 and 162. The outputs of the neural network of FIG. 6 are trained to predict the residuals or errors between the output of the primary model and the target variables. Additionally, the input neurons 140, 142 and 144 may be connected to each of the output units 158, 160 and 162.

The neural network of FIG. 6 is preferably developed using matrix mathematical techniques commonly used in programmed neural networks. Input vectors presented to neurons 140, 142 and 144 are multiplied by a weighting matrix for each of the layers, the values in the weighting matrix representing the weightings or coefficients of the particular input to the result being provided by the related neuron. An output vector presented to neurons 148, 150, 152 and 154 and propagated forward is from the sum of the matrix multiplications. Thus, the input layer 139 of FIG. 6 uses the inputs to the neurons 140, 142 and 144, along with the value of the bias neuron 146, as the input vector and produces an output vector which is then used as the input vector for the hidden layer 147. The outputs of the hidden layer neurons 148, 150, 152 and 154, as well as the bias neuron 156, are further used to produce an output vector which is used as the values in neurons of the output layer 157. Preferably, the neurons in the neural network use a hyperbolic transfer function such as $(E^x - E^{-x}) \div (E^x + E^{-x})$ for x values in the range of minus infinity to positive infinity.

The neural network of FIG. 6 may be trained through conventional learning algorithms well known to those skilled in the art such as the back-propagation, radial basis functions, or generalized regression neural networks. The neural network is trained to predict the difference between the primary model predictions and the target variables. The outputs are obtained by running the primary model over all available data and calculating the difference between the outputs of the primary model and the target variables for each data point using the neural network training process. Thus, the neural network of FIG. 6 learns how to bias the primary model to produce accurate predictions.

Further, in the event that the primary analyzer 132 deploys a derivative calculator at the output 133, the neural network of the error correction analyzer 136 can be trained to predict the error in the derivative of the output 133 of the primary analyzer 132. Similarly, if the primary analyzer 132 further deploys an integrator to integrate the output of the derivative calculator, the neural network of the error correction analyzer 136 can be further trained to predict the error in the integrated value of the derivative of the output 133.

FIG. 7 shows an alternative to the neural network analyzer or model of FIG. 6, called a neural network partial least squares (NNPLS) error correction analyzer or model. Although highly adaptable, the training a high dimension conventional neural network such as that of FIG. 6 becomes difficult when the numbers of inputs and outputs increase. To address the training issue, the NNPLS model does not directly use the input and output data to train the neural network. Rather, the training data are processed by a number of PLS outer transforms 170, 180 and 190. These transforms decompose a multivariate regression problem into a number of univariate regressors. Each regressor is implemented by a small neural network in this method. The NNPLS of FIG. 7 can typically be trained quicker than a conventional multilayer feedforward neural network. Further, the NNPLS' reduction of the number of weights to be computed reduces the ill-conditioning or over-parameterized problem. Finally, the NNPLS faces fewer local minima owing to the use of a smaller size network and thus can converge to a solution quicker than the equivalent multilayer neural network.

Turning now to FIG. 7, the schematic illustration of the NNPLS model is shown in more detail. As the error correction analyzers or models 131 and 136 are structurally identical, the description of the neural network PLS error correction analyzer or model 131 applies equally to the description of the neural network PLS error correction analyzer or model 136. In FIG. 7, a PLS outer analyzer or model 170 is used in conjunction with a neural network 172 for solving the first factor. Thus, in the combination of the PLS 170 and the neural network 172, the PLS outer analyzer or model 170 generates score variables from the X and Y matrices. The scores are used to train the inner network analyzer or model 172. The neural network 172 can be multilayer feed forward networks, radial basis functions, or recurrent networks. The output of the neural network 172 is applied to the respective variables X and Y using the summing devices 176 and 174 respectively. The outputs from the summer 174, F1, and 176, E1, are provided into the next stage for solving the second factor solution.

In the analyzer or model of FIG. 7, the outputs of the first PLS outer model 170 and the neural network 172, F1 and E1, are provided to a second combination including a PLS outer model 180 and a neural network 182. The PLS outer model 180 receives F1 and E1 as inputs. The output from the PLS outer model 180 are provided to train the neural network 182. Further, the outputs of the neural network 182 are provided to summers 184 and 186 to generate outputs F2 and E2, respectively. Further, a number of additional identical stages can be cascaded in a similar manner. At the end of the network of FIG. 7, the output from the summers generating Fi and Ei are provided to a final PLS outer model 190. The output of the final PLS outer model 190 is used to train a final neural network 192.

As shown, in each stage of the NNPLS of FIG. 7, original data are projected factor by factor to latent variables by outer PLS models before they are presented to inner neural networks which learn the inner relations. Using such plurality of stages, only one inner neural network is trained at a time, simplifying and reducing the training times conventionally associated with conventional neural networks. Further, the number of weights to be determined is much smaller than that in an m-input/p-output problem when the direct network approach is used. By reducing the number of weights down to a smaller number, the ill-conditioning or over-parameterized problem is circumvented. Also, the number of local minima is expected to be fewer owing to the use of a smaller size network. Additionally, as the NNPLS is equivalent to a multilayer neural network such as the neural network of FIG. 6, the NNPLS model captures the non-linearity and keeps the PLS projection capability to attain a robust generalization property.

Referring now to FIG. 8, an inner single input single output (SISO) neural network representative of each of the neural networks 172, 182 and 192 (FIG. 7) is shown in greater detail. Preferably, a three layer feed forward neural network with one hidden layer should be used as the inner SISO nonlinear model. Each neuron in the hidden layer of the neural network preferably exhibits a sigmoidal function such as the following centered tanh function:

$$\sigma(z) = \frac{e^z - e^{-z}}{e^z + e^{-z}}$$

with which a zero input leads to a zero output. This is consistent with the following specific properties of the PLS inner model:

$$\sum_{i=1}^{n} u_{hi} = 0 \text{ and } \sum_{i=1}^{n} t_{hi} = 0$$

where $u_{hi}$ and $t_{hi}$ are the ith elements of $U_h$ and $t_h$, respectively.

In FIG. 8, the input data is presented to an input neuron 272. The input neuron 272 further stores a weighting factor matrix $\omega_1$. Also, at the input layer level, an input bias neuron stores a weighting factor matrix $\beta_1$.

The SISO network of FIG. 8 has a hidden layer having a plurality of hidden neurons 282, 284, 286 and 288. Each of the hidden neurons receives as inputs the summed value of the data presented to the input neuron 272, as vector-multiplied with the weighting factor matrix $\omega_1$. Further, each of the hidden neurons receives as an input the value stored in the bias neuron 270, as vector-multiplied with the weighting factor matrix $\beta_1$. In general, the number of hidden neurons is associated with the complexity of the functional mapping from the input to the output. Too few hidden neurons would under-parameterize the problem, or cause the model to fail to learn all conditions presented to it. Alternatively, too many hidden neurons would result in an over-parameterized model where the neural network is over-trained and suffers from over-memorization of its training data. In the preferred embodiment, a cross-validation or train/test scheme is used to determine the optimal number of hidden neurons.

Finally, the SISO network of FIG. 8 has an output layer having one output neuron 290. The output neuron 290 receives as inputs the summed value of the data stored in the hidden neurons 282–288, as vector-multiplied with the weighting factor matrix $\omega_2$. Further, the output neuron 290 receives as input the value stored in the bias neuron 280, as vector-multiplied with the weighting factor matrix $\beta_2$. The output of the neuron 290 is $\hat{U}_h$. The SISO network of FIG.

8 is thus a smaller network than the conventional neural network which can be trained quicker.

Due to its small size, the SISO neural network can be trained quickly using a variety of training processes, including the widely used back-propagation training technique. Preferably, the SISO network of FIG. 8 uses a conjugate gradient learning algorithm because its learning speed is much faster than back-propagation approach and the learning rate is calculated automatically and adaptively so that they do not need to be specified before training.

Prior to training, the SISO network needs to be initialized. When using the preferred conjugate gradient training process, the SISO network will seek the nearest local minimum from a given initial point. Thus, rather than using the conventional random-valued network weight initialization, the preferred embodiment initializes the SISO network using the linear PLS process which takes the best linear model between $u_h$ and $t_h$ to initialize the first hidden node of the network. Additional hidden nodes is then initialized with small random numbers.

Figure 9:
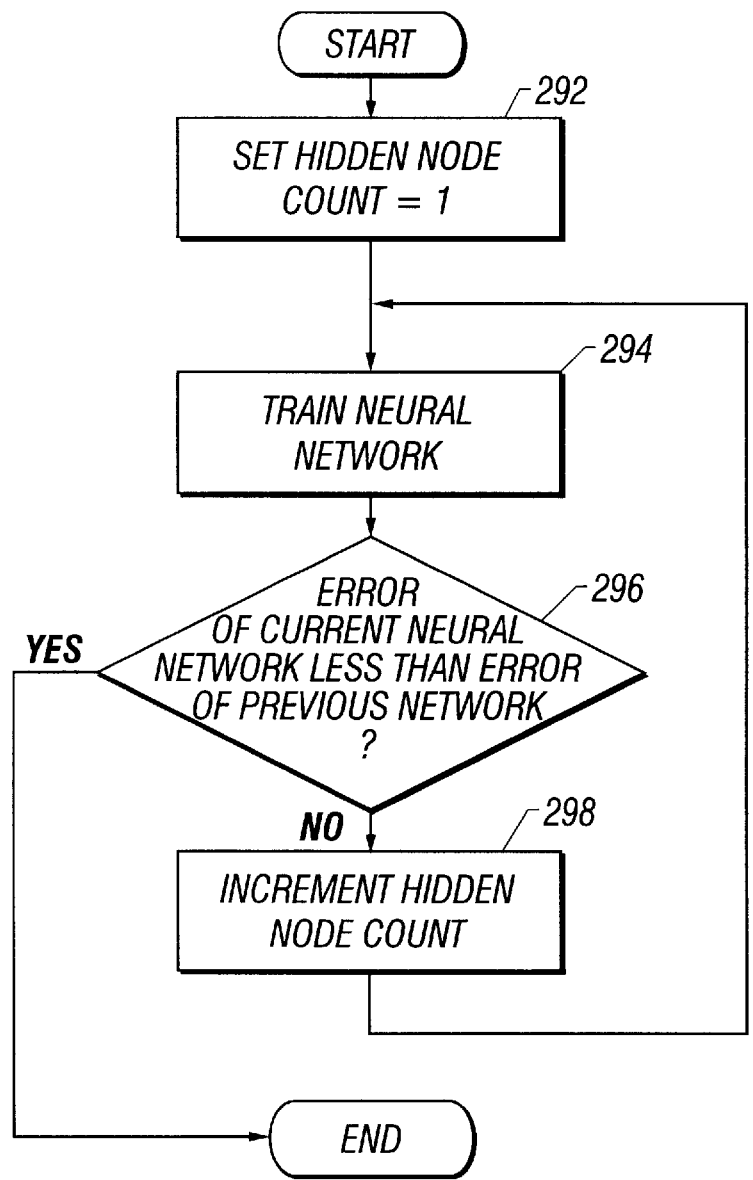
FIG. 9 is a flow chart of the process for determining the number of hidden neurons in the inner neural network of FIG. 8.

Turning now to FIG. 9, the routine for selecting the number of hidden neurons of FIG. 8 is shown. In the preferred training scheme, the available data for modeling are divided into two sets: training data and testing data and then are transformed into corresponding score variables $\{t_h\}$ and $\{U_h\}$. The inner network training starts with one hidden node in step 292 and is trained using training data set in step 294. Next, the training routine tests if more hidden neurons are required based on the prediction error on the test data set in step 296. Additional hidden neurons can be added in step 298, and the efficacy of the additional neurons can be tested by checking the deviation of the SISO network from the expected results. From step 298, the routine loops back to step 294 to check the efficacy of the new arrangement. The routine stops adding additional hidden neurons when the best prediction error for the test data set has been obtained from step 296. By adding a sufficient number of hidden neurons, but not too many, to the network, the optimal number of hidden neurons is achieved.

Figure 10:
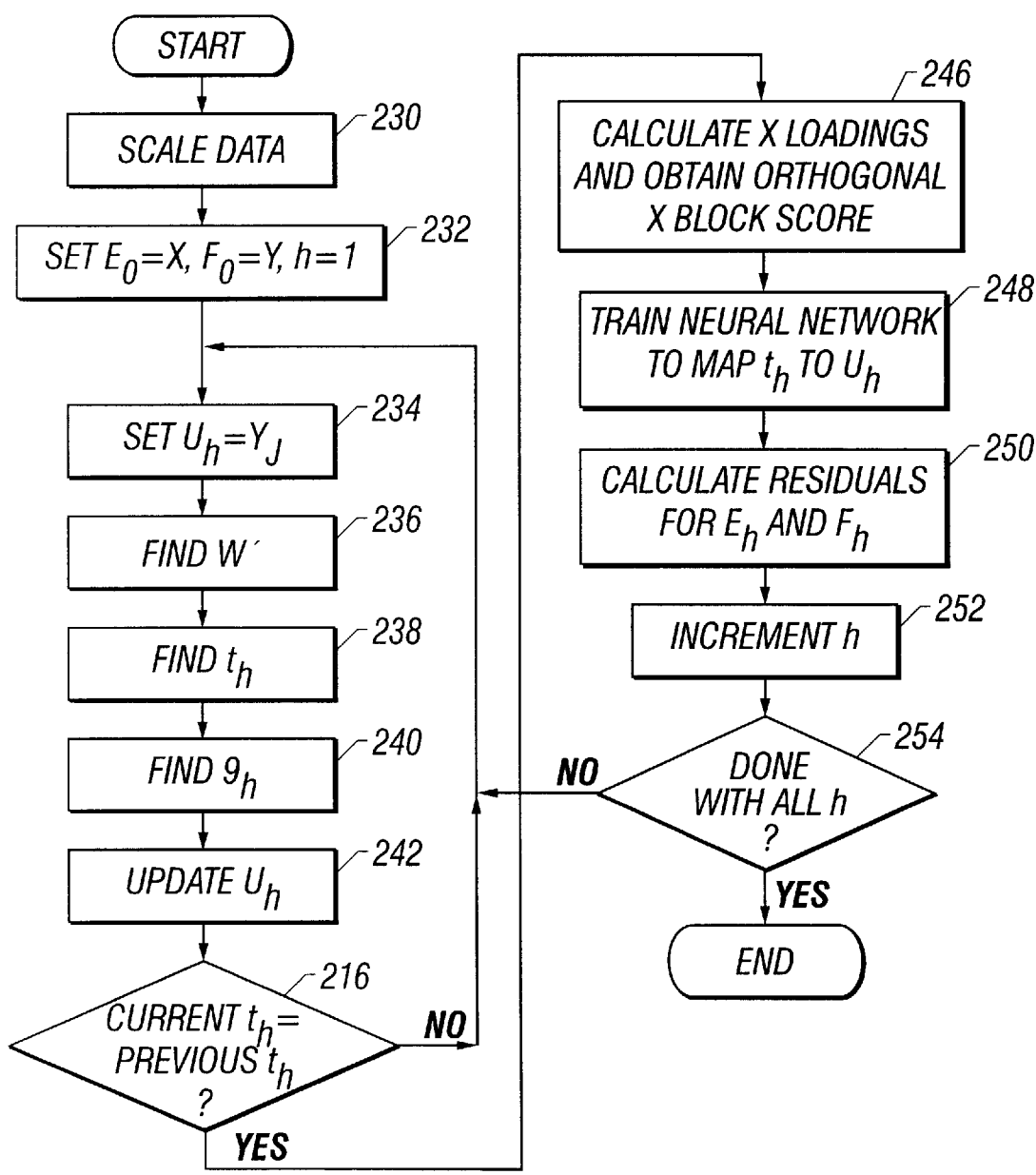
FIG. 10 is a flow chart of the process for training the inner neural network PLS model of FIG. 7.

Turning now to FIG. 10, the process for training the NNPLS model of FIG. 7 is shown. The NNPLS model is trained based on a similar framework as the PLS model described previously. In step 230, the input variables are scaled such that the input data X and the output data Y are preferably mean-centered and fitted into a unit-variance as follows:

$$x_{ij} = (x_{ij} - \bar{x}_j)/S_j^x$$

where $$\bar{x} = [\bar{x}_1, \bar{x}_2, \ldots, \bar{x}_m]$$

$$\bar{x}_j = \frac{1}{N} \sum_{i=1}^{N} x_{ij}$$

$$S_j^x = \sqrt{\frac{1}{N-1} \sum_{i=1}^{N} (x_{ij} - \bar{x}_j)^2}$$

and $$y_{ij} = (y_{ij} - \bar{y}_j)/S_j^y$$

with $$\bar{y} = [\bar{y}_1, \bar{y}_2, \ldots, \bar{y}_p]$$

$$\bar{y}_j = \frac{1}{N} \sum_{i=1}^{N} y_{ij}$$

$$S_j^y = \sqrt{\frac{1}{N-1} \sum_{i=1}^{N} (y_{ij} - \bar{y}_j)^2}$$

Next, the variables E, F, and H are initialized in step 232 by setting $E_o=X$, $F_o=Y$, and h=1. Further, the processing of each latent component h is performed in steps 234–252.

In step 234, one column of Y is used as a starting vector for u such that $u_h=y_j$. Next, in the X block, the value of w' is calculated in step 236 as:

$$w'_h = u'_h E_{h-1}/\|u'_h E_{h-1}\|$$

In step 238, $t_h$ is calculated from $E_{h-1}$ and $w'_h$:

$$t'_h = E_{h-1} W_h$$

Next, in the Y block, $q_h$ is calculated from $F_{h-1}$ and $t_h$ in step 240 as follows:

$$q'_h = t'_h F_{h-1}/\|t'_h F_{h-1}\|$$

In step 242, $u_h$ is updated by the following equation:

$$u_h = F_{h-1} q_h$$

Next, in step 244, the routine checks for convergence by examining whether if the current $t_h$ is equal to the previous $t_h$, within a certain predetermined rounding error. If not, the routine loops back to step 234 to continue the calculations. Alternatively, from step 244, if the current $t_h$ is equal to the previous $t_h$, the routine calculates the X loadings and obtains the orthogonal X block scores in step 246. The score is computed as follows:

$$p'_h = t'_h E_{h-1}/t'_h t_h$$

The $P_h$ is then normalized such that:

$$P'_{h\_new} = P'_{h\_old}/\|P'_{h\_old}\|;$$

$$t_{h\_new} = t_{h\_old} \|P'_{h\_old}\|;$$

$$w'_{h\_new} = w'_{h\_old} \|P'_{h\_old}\|$$

where $p_h'$, $q_h'$ and $W_h'$ are the PLS model parameters that are saved for prediction by the run-time model; $t_h$ and $u_h$ are scores that are saved for diagnostic and/or classification purposes.

Next, in step 248, the routine trains the neural network to map $t_h$ to $u_h$. The SISO neural network maps the inner relations so that the following error function is minimized:

$$J_h = \|u_h - f(t_h)\|^2$$

where $f(t_h)$ is a nonlinear function represented by the neural network, as discussed in more detail below. As a matter of course, other error functions may be minimized depending on the problem. The present invention contemplates that other functions include r-Minkowski error functions, where $J_h = \|u_h - f(t_h)\|^r$ and the Bernoulli function, where $J_h = u_h * \ln(f(t_h))$.

Next, the routine of FIG. 9 calculates the residuals in step 250. In step 250, for the h component of the X block, the outer relation is computed as:

$$E_h = E_{h-1} - t_h p'_h$$

Further, in step 250, for the h component of the Y block, the mixed relation is subject to:

$$F_n = F_{h-1} - \hat{u}_h q'_h, \text{ where } \hat{u}_h = f(t_h)$$

Next, the h component is incremented in step 252. In step 254, the routine checks to see if all h components have been computed. If not, the routine loops back to step 234 to continue the computation. Alternatively, from step 254, if all h components have been computed, the routine exits. In this manner, regression is used to compress the predicted data matrix that contains the value of the predictors for a particular number of samples into a set of latent variable or factor scores. Further, by running a calibration on one set of data (the calibration set), a regression model is made that is later used for prediction on all subsequent samples.

Figure 11:
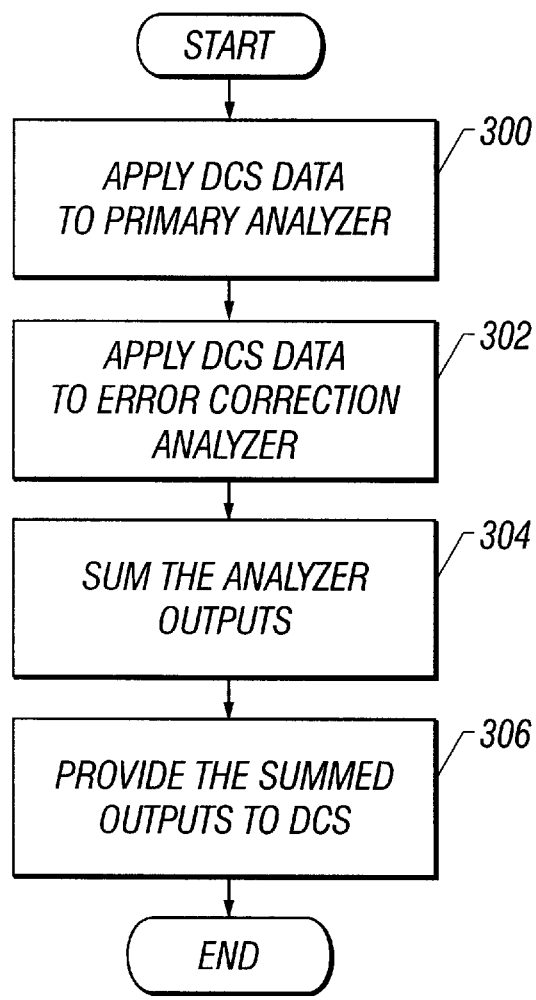
FIG. 11 is a flow chart of the process control process using the hybrid neural network PLS analyzer of FIG. 4.

Turning now to FIG. 11, the process for performing the process control of FIG. 4 is shown. In step 300, input variables is recorded by the DCS system 124 and presented to the primary analyzer 130. In the data derived primary analyzer 130, the regression model generated by the process of FIG. 5 is used to generate outputs during the run-time. It is to be noted that the data for the new X block may have the same or fewer samples than the N samples used during training.

During the run-time, as p', q', w' have been saved as model parameters, the prediction is performed by decomposing the new X block and building up new Y block. Preferably, the analyzer uses the collapsed equation:

$$y' = x'W(P'W)^{-1}BQ'$$

for each new input vector x'. For the X block, t is estimated by multiplying X by w as in the modeling process:

$$\hat{t}_h = E_{h-1} W_h$$

$$E_h = E_{h-1} - \hat{t}_h P'_h$$

For the Y block, Y is estimated as $$Y = \Sigma b_h \hat{t}_h q'_h$$

In step 302, the same DCS data variables are also presented to the error correction analyzer 131 of FIG. 4. In the embodiment with the multilayer feedforward neural network of FIG. 6, the DCS data variables are presented to the input layer 139 and are propagated as conventional through the hidden layer 147 and ultimately to the output layer 157. The outputs of the neural network of FIG. 6 are the residuals or errors between the output of the primary model and the target variables. The outputs of the PLS analyzer 130 and the neural network error correction analyzer 131 are summed by the adder 134.

In the second embodiment which uses the NNPLS network of FIG. 8, there are two schemes to perform the NNPLS analyzer or model prediction. The first one is just similar to using the linear PLS model as described above. As p', a', w' have been saved as model parameters, the prediction can be performed by decomposing the new X block first and then building up new Y block. For the X block, t is estimated by multiplying X by w as in the modeling process:

$$\hat{t}_h = E_{h-1} W_h$$

$$E_h = E_{h-1} - \hat{t}_h P'_h$$

For the Y block, Y is estimated as $$Y = \sum_{h=1}^{r} \hat{u}_h q'_h$$

with $\hat{u}_h = f(t_h)$. Preferably, when the collapsed equation is used, $$y' = f(x'W(P'W)^{-1})Q'$$

for each new input vector x'.

The second prediction scheme uses a converted equivalent neural network of the NNPLS model to map inputs data X directly to output data Y. This equivalent neural network is obtained by collapsing the NNPLS model based on the following relations:

$$Y = \sigma(X\omega_1 + e\beta'_1)\omega_2 + e\beta'_2 + F_r$$

where $$\omega_1 = [\hat{w}_1 \omega'_{11} \hat{w}_2 \omega'_{12} \ldots \hat{w}_r \omega'_{1r}]$$

$$W_2 = \begin{bmatrix} \omega_{21} q'_1 \\ \omega_{22} q'_2 \\ \cdot \\ \cdot \\ \cdot \\ \omega_{2r} q'_{1r} \end{bmatrix}$$

$$\beta'_1 = [\beta'_{11} \beta'_{12} \ldots \beta'_{1r}]$$

$$\beta_2 = \sum_{h=1}^{r} \beta_{2h} q_h$$

and $$N_{hid} = \sum_{h=1}^{r} n_h$$

Once the outputs from the primary analyzer 130 and the error correction analyzer 131 have been generated, they are summed by the adder 134 before the outputs are provided to the DCS 124 in step 306.

The process shown in FIG. 11 thus discloses the operation of the hybrid analyzer of FIG. 4. As discussed, the hybrid analyzer 122 has the data derived primary analyzer 130 and the error correction analyzer 131 connected in parallel. The primary analyzer 130, preferably a data derived partial least squares model, is trained using training data to generate major predictions of defined output variables. The error correction analyzer 131, preferably a non-linear model such as a neural network model, is trained to capture the residuals between the primary analyzer 130 outputs and the target process variables. The residuals generated by the error correction analyzer 131 is summed with the output of the primary analyzer 130 to compensate for the error residuals of the primary analyzer to arrive at a more accurate overall model of the target process.

Thus, the present invention provides for the control of processes in the plant using the hybrid analyzer. The hybrid analyzer senses various input/output variables such as material compositions, feed rates, feedstock temperatures, and product formation rate typically present in oil refineries, chemical plants and power plants. Also, the data derived hybrid analyzer 130 provides a readily adaptable framework to build the model without requiring advanced information about the process to be controlled. The primary analyzer 130, which incorporates the PLS analyzer, further provides a model that is readily understandable for process control engineers, as the resulting model is also more easily interpreted than the coefficients of the neural networks and other non-parametric models. Further, the primary analyzer 130 addresses problems of data confounding, where the primary analyzer 130 can extrapolate its model to handle situations not presented during the training sessions. Thus, the hybrid analyzer 122 addresses the reliability of the process model output over a wider operating range since the primary analyzer 130 can extrapolate data in a predictable way beyond the data used to train the analyzer or model. The combination of the PLS and the neural network helps provide accurate, consistent and reliable predictions when faced with sparse, noisy data. Further, the hybrid system is flexible enough to be tailored to the specific process being modeled. Together, the primary and the error correction analyzers produce a more accurate hybrid process analyzer which mitigates the disadvantages, and enhances the advantages of each modeling methodology when used alone.

In addition to the PLS linear analyzer or model discussed above, the present invention contemplates that other linear models or analyzers could be used instead. Further, it is to be understood that other neural network analyzers or models can be used, depending on the particular process and environment. Additionally, the number of manipulated, disturbance and controlled variables, optimization goals and variable limits can be changed to suit the particular process of interest.

It is to be further understood that the description of data to be collected such as the reflux flow rate and the reboil steam flow rate are associated with the operations of the chemical plant and has only been provided as examples of the types of variables to be collected. The techniques and processes according to the present invention can be utilized in a wide range of technological arts, such as in many other process control environments, particularly multi-variable and more particularly non-linear environment present in a number of plants such as oil refineries, chemical plants, power plants and industrial manufacturing plants, among others. Further, the present invention can be used to improve the analyzer or model for a number of areas, particularly in forecasting prices, change in price, business time series, financial modeling, target marketing, and various signal processing applications such as speech recognition, image recognition and handwriting recognition. Thus, the present invention is not limited to the description of specific variables collected in the illustrative chemical plant environment.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed:

1. An apparatus for modeling a process, said process having one or more disturbance variables as process input conditions, one or more corresponding manipulated variables as process control conditions, and one or more corresponding controlled variables as process output conditions, said apparatus comprising:

a data derived primary analyzer adapted to sample an input vector spanning one or more of said disturbance variables and manipulated variables, said data derived primary analyzer generating an output based on said input vector;

a derivative calculator for computing a derivative of the output of said primary analyzer;

an integrator coupled to the output of said derivative calculator for generating a predicted value;

an error correction analyzer adapted to sample said input vector, said error correction analyzer estimating a residual between said data derived primary analyzer output and said controlled variables; and an adder coupled to the output of said data derived primary analyzer and said error correction analyzer, said adder summing the output of said primary and error correction analyzers to estimate said controlled variables.

2. The apparatus of claim 1, wherein said data derived primary analyzer and said error correction analyzer sample said input vector continuously.

3. The apparatus of claim 1, wherein said data derived primary analyzer and said error correction analyzer sample said input vector using predetermined delay periods.

4. The apparatus of claim 3, wherein said delay period is determined using an adaptive process.

5. The apparatus of claim 3, wherein said delay period is user selectable.

6. The apparatus of claim 1, wherein said disturbance and manipulated variables are latent variables.

7. The apparatus of claim 1, wherein said data derived primary analyzer is a linear model.

8. The apparatus of claim 7, wherein said linear model is a Partial Least Squares (PLS) model.

9. The apparatus of claim 8, further comprising a filter coupled to the output of said data derived primary analyzer, said filter receiving said output vector and providing a filtered vector as an output.

10. The apparatus of claim 9, wherein said filter is adaptive.

11. The apparatus of claim 9, wherein said filter is a Kalman filter adapted to receive said controlled variables.

12. The apparatus of claim 8, wherein said PLS model further comprises a spline generator for mapping said input vector to said primary analyzer output.

13. The apparatus of claim 8, wherein said error correction analyzer is a neural network.

14. The apparatus of claim 13, wherein said neural network further comprises:

a derivative calculator for computing a derivative of the output of said primary analyzer; and an integrator coupled to the output of said derivative calculator for generating a predicted value suitable for correcting the output of said data derived primary analyzer.

15. The apparatus of claim 13, further comprising a filter coupled to the input of said data derived primary analyzer, said filter receiving said input vector and providing a filtered vector for capturing the dynamics of the process to the input of said neural network.

16. The apparatus of claim 8, wherein said error correction analyzer is a neural network partial least squares model.

17. The apparatus of claim 1, further comprising:

a distributed control system coupled to the output of said adder; and a run-time delay and variable selector coupled to the output of said distributed control system, said run-time delay and variable selector generating said input vector.

18. The apparatus of claim 17, wherein said run-time delay and variable selector are adapted to receive delay and variable settings, wherein said data derived primary analyzer and said error correction analyzer are adapted to receive model parameters, said apparatus further comprising:

a data repository for storing historical values of said disturbance variables, said manipulated variables and said controlled variables;

a development delay and variable selector coupled to said data repository for selecting and time-shifting one or more of said disturbance variables, said manipulated variables and said controlled variables, said development delay and variable selector generating said delay and variable settings;

a hybrid development analyzer coupled to said development delay and variable selector, said hybrid development analyzer generating said model parameters.

19. The apparatus of claim 17, wherein said hybrid development analyzer further comprises:

a development primary analyzer coupled to said data repository, said development primary analyzer adapted to sample a development input vector spanning one or more of said disturbance variables and manipulated variables, said development primary analyzer adapted to sample one or more controlled variables, said development primary analyzer generating an output based on said input vector;

a subtractor coupled to said data repository and to said development primary analyzer, said subtractor adapted to receive one or more controlled variables from said data repository, said subtractor generating a primary model error output;

a development error correction analyzer coupled to said data repository and said development primary analyzer error output, said development error correction analyzer adapted to sample said development input vector, said development error correction analyzer estimating a residual between said development primary analyzer output and said controlled variables; and an adder coupled to the output of said development primary analyzer and said development error correction analyzer, said adder summing the output of said primary and error correction analyzers to estimate said controlled variables.

20. An apparatus for modeling a process, said process having one or more disturbance variables as process input conditions, one or more corresponding manipulated variables as process control conditions, and one or more corresponding controlled variables as process output conditions, said apparatus comprising:

a Partial Least Squares model data derived primary analyzer adapted to sample an input vector spanning one or more of said disturbance variables and manipulated variables, said data derived primary analyzer generating an output based on said input vector, said PLS model comprising a spline generator for mapping said input vector to said primary analyzer output;

an error correction analyzer adapted to sample said input vector, said error correction analyzer estimating a residual between said data derived primary analyzer output and said controlled variables; and an adder coupled to the output of said data derived primary analyzer and said error correction analyzer, said adder summing the output of said primary and error correction analyzers to estimate said controlled variables.

* * * * *